Patented May 31, 1949

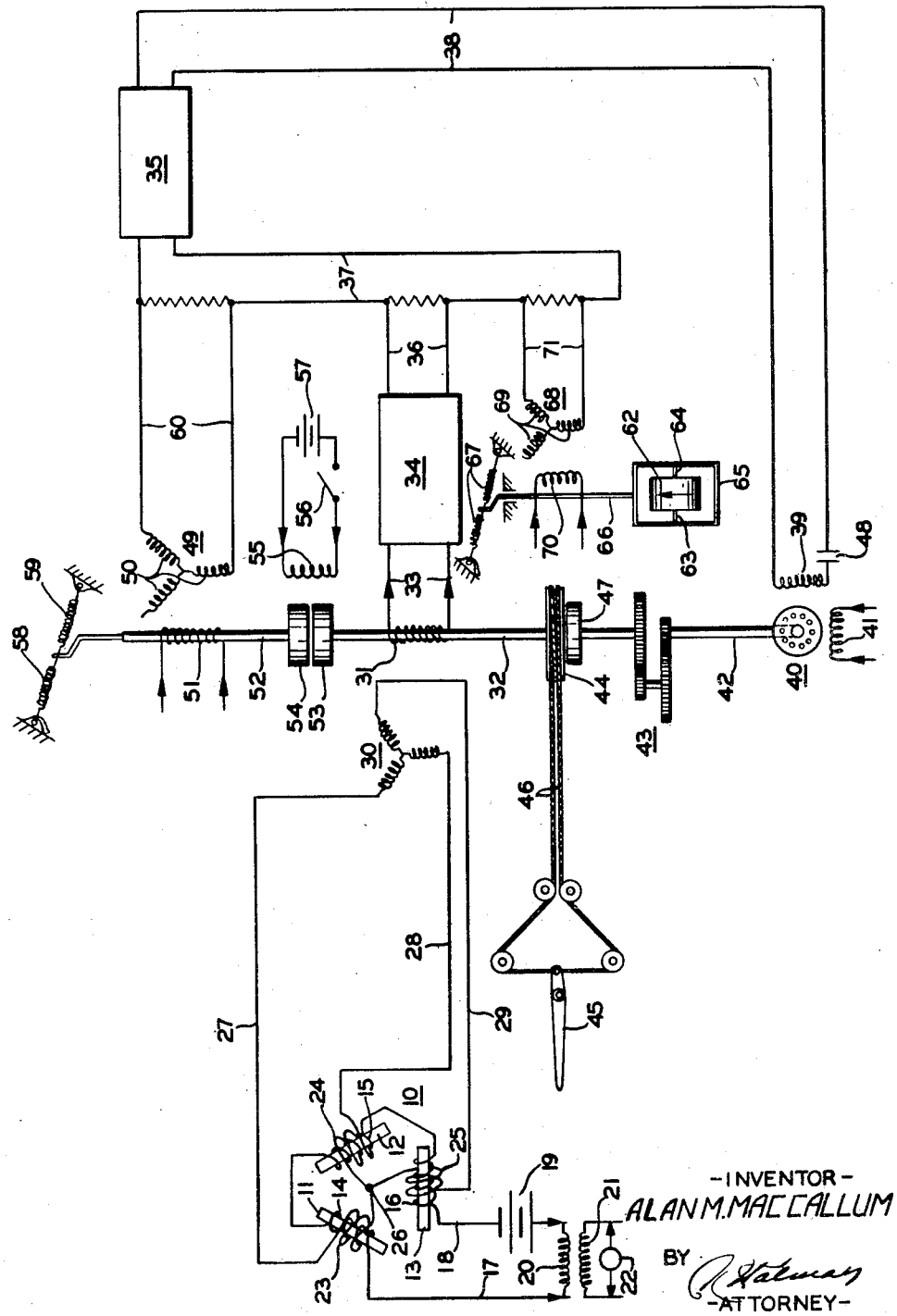

2,471,637

UNITED STATES PATENT OFFICE 2,471,637

AUTOMATIC STEERING CONTROL

Alan M. MacCallum, Maywood, N. J., assignor to Bendix Aviation Corporation, Teterboro, N. J., a corporation of Delaware Application November 26, 1945, Serial No. 630,808

12 Claims. (Cl. 318—489)

The present invention relates to automatic steering systems for mobile craft and more particularly to a simplified rudder control for use in such systems.

Systems of this general character have been provided, heretofore, with a master indicator containing a servomotor for receiving, amplifying and reproducing a signal from a direction responsive or sensing device and transmitting the signal through another amplifier to a second servomotor for operating the rudder to return and maintain a craft in a predetermined direction and on a prescribed course. Illustrative of such systems is that shown and claimed in copending application Serial No. 516,488 filed December 31, 1943. Due to the fact that the sensing signal was used to actuate a first servomotor to develop a signal proportional to the sensing signal for actuating the rudder servomotor, a certain lag was developed between the generation of the sensing signal and rudder response whereby the sensitivity of the system was impaired to some extent.

An object of the present invention, therefore, is to provide a novel automatic steering system whereby the foregoing disadvantages have been overcome.

Another object of the invention is to provide a novel and simplified rudder control for automatic steering systems.

A further object is to provide a novel and simplified rudder control for automatic steering systems whereby rudder response will be nearly instantaneous with the generation of a direction or sensing signal.

Another object of the present invention is to provide a novel, light-weight and simplified rudder control for automatic steering systems wherein but one servomotor is utilized in the rudder control channel so that the sensitivity of the system in its response to direction or sensing signals is increased to a large degree.

The above and other objects and advantages of the present invention will appear more fully hereinafter from a consideration of the detailed description which follows, taken together with the accompanying drawing wherein one embodiment of the invention is illustrated. It is to be expressly understood, however, that the drawing is for the purpose of illustration and description only, and is not designed as a definition of the limits of the invention.

The single figure of the drawing is a diagrammatic illustration of the novel, simplified and light-weight rudder control system constituting the subject matter of the present invention.

Referring now to the drawing for a more detailed description of the present invention, a magnetic pick-up or direction sensing device 10 is provided which comprises a plurality of core members 11, 12 and 13 arranged in triangular relation, each of the members being constituted by a single, integral element comprising one or more laminations of permeably magnetic material adapted to be subjected to the earth's magnetic field. Cores 11, 12 and 13 are further provided with primary or energizing windings 14, 15 and 16, respectively, and, as shown, only one winding is wound around each respective core, the group of windings, however, being connected in series and having a pair of terminals 17 and 18 for connecting the windings through a battery 19 and the secondary windings 20 of a transformer whose primary winding 21 connects directly with the craft's source 22 of alternating current supply whereby the primary windings are fed with undulating or varying uni-directional current.

Surrounding the primary windings 14, 15 and 16 are the respective secondary or output windings 23, 24 and 25, the latter being connected in Y-relation by connecting like ends of the windings together at 26, the opposite ends of the respective windings being connected through leads 27, 28 and 29 with the three phase wound stator 30 of an inductive device having a rotor winding 31 inductively coupled therewith. As will be apparent to those skilled in the art, pick-off devices of this character are generally stabilized by an artificial horizon gyro so that the earth's magnetic field traverses each core member, the flux density due to the earth's field in each core being dependent upon the angular relation of each core with respect to the earth's field. Assuming no energizing current in primary windings 14, 15 and 16, the magnetic flux of the earth's field will thread each of the cores 11, 12 and 13 varying in amount with the angular disposition of each leg relative to the field. So long as the earth's flux in each leg is in a steady state, no voltages will be induced in secondaries 23, 24 and 25, but as soon as undulating or a varying uni-directional current is supplied to primary windings 14, 15 and 16, the legs are saturated periodically, or once per cycle of the current at source 22 connected to primary 20 of the transformer, whereby the earth's magnetic field will leave cores 11, 12 and 13 at a rate depending upon the frequency of the current source. Voltages will be induced, therefore, in windings 23, 24 and 25 setting up therein, as well as within wound stator 30, alternating currents having the same frequency as the fundamental frequency of the current source. With each deviation from a prescribed course of a craft supporting device 10, therefore, the induced voltages at secondaries 23, 24 and 25 will vary in accordance with the deviation.

For a condition of equilibrium, with the craft on a given course and in a substantially horizontal plane, the voltages within the three windings of stator 30 will correspond to the voltages at the three secondary windings 23, 24 and 25 of the pick-up device. At the same time rotor winding 31, which is supported by a suitably journalled shaft 32, will be in an angular position with its electrical axis normal to the resultant of the magnetic field of the windings of stator 30 so that the voltages in the latter will have no inductive effect on the rotor winding. As soon, however, as the craft deviates from a prescribed course, the voltages at the three windings 23, 24 and 25 will vary causing a variation in the voltages of each of the windings of stator 30. Such change at the stator produces an angular change in the resultant of the magnetic field thereat and, since the electrical axis of the rotor winding is no longer normal to the resultant of the field at the stator, a signal is induced within the rotor winding which is proportional to the angle of craft deviation from its prescribed course.

Where in the prior art, the signal so developed at rotor winding 31 was amplified to energize a first servomotor which, in turn, actuated a transmitting device for developing a signal proportional to that at the rotor winding to energize a second servomotor connected to the rudder, by the novel arrangement of the present invention the signal of rotor winding 31 is fed directly to the rudder actuating servomotor. To this end, winding 31 is connected by way of leads 33 to the input of a conventional amplifier 34, where the relatively weak signal appearing at the rotor winding is amplified, the output of the amplifier being fed to the input of a second conventional amplifier 35 by way of leads 36 and 37. The output of amplifier 35 is fed by way of leads 38 to energize the variable phase 39 of a two phase induction motor 40 whose second or fixed phase 41 is constantly energized from the craft's source of current supply. In order to displace the phases of the currents in windings 39 and 41 substantially 90°, a suitable condenser 48 is provided at winding 39. Even though a two phase motor has been shown, it is obvious that any polyphase motor could be utilized to accomplish the desired end.

Motor 40 is drivably connected with a shaft 42 which, through a speed reduction gear train 43, connects the motor to shaft 32. Sleeved about shaft 32 is a pulley 44 which interconnects motor 40 with a rudder control surface 45 through conventional cables 46. Pulley 44 may be connected to shaft 32 through mechanical or electrical means, shown generally at 47, which means may comprise a disconnect type clutch of the character shown and claimed in copending application Serial No. 534,969 filed May 10, 1944, now Patent No. 2,399,821.

Means are also provided for generating a follow-back signal when motor 40 is energized to operate the rudder for the purpose of modifying operation of the motor and thereby define an electrical follow-up connection between the rudder and the magnetic pick-up device. Such means comprise, as shown, an inductive device 49 having a wound stator 50 and an inductively coupled rotor winding 51 carried by a shaft 52 coaxially aligned with shaft 32. Means are also provided for drivably connecting shafts 32 and 52 at will, such means comprising a clutch having two magnetic clutch faces 53 and 54, one being fastened to shaft 32 and the other to shaft 52, the two clutch faces being surrounded by a coil 55 connected through a switch 56 with a source 57 of current supply. Upon closing of switch 56, coil 55 is energized causing clutch faces 53 and 54 to engage and thereby provide a driving connection between shafts 32 and 52.

With switch 56 open, rotor winding 51 is urged to a normally null position with respect to stator windings 50 by way of a pair of coil springs 58 and 59 which are anchored at their outer ends and at their inner ends are connected to shaft 52. Such centering of rotor winding 51 provides a synchronizing feature in that rotor 51 will be at all times properly positioned for automatic control notwithstanding the position of rudder 45 just prior to the closing of switch 56.

Rotor winding 51 is fed with current from the craft's supply source while stator windings 50 which are inductively coupled with winding 51 will have a signal developed therein due to relative motion of rotor 51 from a null position, such signal being fed by way of leads 60 to the input of amplifier 35 to be there mixed with the direction or sensing signal of rotor winding 31 for controlling operation of motor 40.

If it is desired to control the craft in direction manually, switch 56 is opened and pulley 44 is disconnected from shaft 32 so that rudder 45 may be controlled in a conventional manner. For automatic control of the rudder, on the other hand, switch 56 is closed to drivably connect rotor winding 51 of inductive device 49 with motor 40 and pulley 44 is connected to shaft 32. As pointed out above, with the craft on a prescribed course, no signal will appear at rotor winding 31 and rudder 45 will be in a normally centered or trailing position. As soon as a craft deviation from a prescribed course occurs, a signal is induced within rotor winding 31, proportional to the amount of craft deviation, and is communicated to energize motor 40 which displaces rudder 45, as well as rotor windings 31 and 51. Motor 40 operates until it drives rotor winding 31 to a new null position, i. e., one wherein the electrical axis of winding 31 will attain a normal position relative to the magnetic field of stator 30, in which position the signal of winding 31 drops to zero and, in the absence of inductive device 49, the motor 40 would be de-energized.

Operation of motor 40 displaces rotor winding 51 relative to wound stator 50 so that a signal is developed in the latter which is in opposition to the direction displacement signal and which increases with rudder deviation as a result of continued operation of motor 40 until a given point is reached, at which time the signal within stator 50 is exactly equal and opposite to the direction signal to thereby "wash out" the direction signal at which time motor 40 is de-energized and rudder 45 will have reached a deflected position in proportion to the direction signal.

With rudder in its applied position and motor 40 de-energized, the craft begins to return to its predetermined and prescribed course. In doing so, the direction signal generated by the pick-up device starts to diminish in value while the follow-back signal of stator 50 being at a maximum, becomes predominating and energizes motor 40 in a reverse direction to start bringing the rudder back to a neutral position. With reverse operation of motor 40, the signal in stator 50 diminishes until rotor winding 51 attains its null wherein, unless another direction signal is being generated by the pick-up device, the rudder and the direction signal generating means are in synchronism.

By impressing upon the direction signal, another signal that is dependent on the craft's angular velocity or rate of turn, it is possible to control craft oscillation whereby dead beat steering can be obtained. To this end, a rate of turn gyro is provided which comprises a spinning rotor 62 having a normally horizontal spin axis and mounted by way of inner trunnions 63 and 64 within a gimbal ring 65, the latter being mounted by way of an outer trunnion 66 for oscillation about a second horizontal axis perpendicular to the spin axis. Suitable springs 67 are connected to trunnion 66 to yieldably restrain gyro precession to a rate of turn function as is known in the art.

For the purpose of generating a signal proportional to the rate of craft turn, an inductive transmitting device 68 is provided which comprises a wound stator 69 and a rotor winding 70 inductively coupled with the stator, the rotor being connected to the craft's source of current supply. Rotor winding 70 is mounted on trunnion 66 for angular motion therewith, so that as the craft deviates from its prescribed course, the rate gyro precesses against the action of springs 67 displacing rotor 70 from its normally null position relative to stator 68 developing in the latter a signal proportional to the rate of turn which is communicated by way of leads 71 to the input of amplifier 35 to be there superimposed upon the direction and follow-back signals for further controlling motor 40. With this provision and during an initial craft displacement from a prescribed course, the rate signal aids the direction signal and opposes the follow-back signal so that rudder is applied more rapidly than it would be by the direction signal alone and during a return to course the rate signal (the craft's angular velocity now being in an opposite direction) opposes the direction signal but adds with the follow-back signal so that the craft is prevented from overswinging from its prescribed course once it returns thereto.

Although two amplifiers 34 and 35 have been shown it is to be understood that but one is actually required and in such an event it need only have a pre-amplification stage for the signal appearing in rotor winding 31. The specific circuit for receiving direction, follow-back and rate signals for controlling motor operation is more fully shown and described in the aforementioned copending application.

There has thus been provided by the present invention, a novel, light-weight and simplified rudder control for an automatic steering system of relatively high sensitivity wherein the response of the control surface motor is almost instantaneous with the generation of a direction or sensing signal.

Although but a single embodiment of the invention has been illustrated and described in detail for controlling a craft in azimuth, it is to be expressly understood that the invention is not limited thereto. Various changes may also be made in the design and arrangement of the parts without departing from the spirit and scope of the invention as the same will now be understood by those skilled in the art. For a definition of the limits of the present invention reference will be had primarily to the appended claims.

I claim:

1. An automatic steering system for a craft having a rudder, comprising an inductive device having a multi-polar stator winding and a rotor winding, an actuating device, means for connecting said actuating device to the rotor winding of said inductive device for actuating said rotor winding, a source of alternating current, an induction device comprising a core of permeable magnetic material adapted to receive a magnetic flux from a uni-directional magnetic field, a multi-polar stator winding on said core, a single phase winding on said core connected for energization by said source of alternating current, means for interconnecting the multi-polar winding of said core to the multi-polar winding of said inductive device, means electrically connecting the rotor winding of said inductive device to said actuating device for energizing the latter, and means operative when said actuating device has been connected to said rotor winding for connecting said rudder to said actuating device for operation thereby upon the energization thereof.

2. An automatic steering system for a craft having a rudder, comprising an inductive device having a multi-polar stator winding and a rotor winding, an actuating device, mechanical means connecting said actuating device to the rotor winding of said inductive device for actuating said rotor winding, a source of alternating current, an induction device comprising a core of permeable magnetic material adapted to receive a magnetic flux from a uni-directional magnetic field, a multi-polar stator winding on said core, a single phase winding on said core connected for energization by said source of alternating current, means for interconnecting the multi-polar winding of said core to the multi-polar winding of said inductive device, means electrically connecting the rotor winding of said inductive device to said actuating device for energizing the latter, and means coupling said rudder to said mechanical means for operation by said actuating device upon the energization thereof.

3. An automatic steering system for a craft having a rudder, comprising an inductive device having a multi-polar stator winding and a rotor winding, an actuating device, means connecting said actuating device to the rotor winding of said inductive device for actuating said rotor winding, a source of alternating current, an induction device comprising a core of permeable magnetic material adapted to receive a magnetic flux from a uni-directional magnetic field, a multi-stator winding on said core, a single phase winding on said core connected for energization by said source of alternating current, means for interconnecting the multi-polar winding of said core to the multi-polar winding of said inductive device, means electrically connecting the rotor winding of said inductive device to said actuating device for energizing the latter, means connecting said rudder to said actuating device for operation thereby upon energization of said actuating device, and an electrical follow-up device connected for operation by said actuating device for modifying the energization of the latter.

4. An automatic steering system for a craft having a rudder, comprising an inductive device having a multi-circuit stator winding and a single circuit rotor winding in inductive relation with the stator winding, a two-phase alternating current driving motor adapted for connection to the rotor winding of said inductive device for actuating the latter, a source of alternating current, means connecting said source to energize one phase of said driving motor, direction responsive means comprising an induction device including a multi-circuit winding connected to the multi-circuit winding of said inductive device and a single circuit winding energized by said source of alternating current, whereby another alternating current is generated in the multi-circuit winding of said inductive device to energize the other phase of said driving motor, whereby the latter rotates to actuate the rotor winding of said inductive device upon relative angular displacement of said direction responsive means in azimuth, and means for connecting said rotor winding and said rudder to said driving motor whereby the latter actuates said rudder in accordance with the relative angular displacement of said direction responsive means.

5. An automatic steering system for a craft having a rudder, comprising an inductive device having a multi-circuit stator winding and a single circuit rotor winding in inductive relation with the stator winding, a two phase alternating current driving motor connected to actuate the rotor winding of said inductive device, a source of alternating current, means connecting said source to energize one phase of said driving motor, direction responsive means comprising an induction device including a multi-circuit winding connected to the multi-circuit winding of said inductive device and a single circuit winding energized by said source of alternating current, whereby another alternating current is generated in the multi-circuit winding of said inductive device to energize the other phase of said driving motor, whereby the latter rotates to actuate the rotor winding of said inductive device upon relative angular displacement of said direction responsive means in azimuth, means connecting said rudder to said driving motor whereby the latter actuates said rudder in accordance with the relative angular displacement of said direction responsive means, and an electrical device connected to said motor and actuated thereby for producing a follow-up signal proportional to the angular displacement of said rudder for modifying the operation of said motor.

6. An automatic steering system for a craft having a rudder, comprising an inductive device having a multi-circuit stator winding and a single circuit rotor winding in inductive relation with the stator winding, a two-phase alternating current driving motor connected to actuate the rotor winding of said inductive device, a source of alternating current, means connecting said source to energize one phase of said driving motor, direction responsive means comprising an induction device including a multi-circuit winding connected to the multi-circuit winding of said inductive device and a single circuit winding energized by said source of alternating current, whereby another alternating current is generated in the multi-circuit winding of said inductive device to energize the other phase of said driving motor, whereby the latter rotates to actuate the rotor winding of said inductive device upon relative angular displacement of said direction responsive means in azimuth, means connecting said rudder to said driving motor whereby the latter actuates said rudder in accordance with the relative angular displacement of said direction responsive means, an electrical device connected to said motor and actuated thereby for producing a follow-up signal proportional to the angular displacement of said rudder, means for generating a further signal proportional to the rate of displacement of said direction responsive means in azimuth, and means for impressing said follow-up signal and said rate signal upon said other phase of said motor for modifying the operation of the latter.

7. An automatic steering system for a craft having a rudder, comprising a servomotor for operating said rudder, an inductive device having a wound stator and a wound rotor, means for simultaneously connecting said motor to said rudder and to said wound rotor for actuating the latter relative to said stator, a source of alternating current, an induction device comprising a core of permeable magnetic material adapted to receive a magnetic flux from a uni-directional magnetic field, a secondary winding on said core, a primary winding on said core connected for energization by said source of alternating current, means for interconnecting the secondary winding of said core to the wound stator of said inductive device, and means electrically connecting the wound rotor of said inductive device to said motor for energizing the latter to operate said rudder.

8. An automatic steering system for a craft having a rudder, comprising a servomotor for operating said rudder, an inductive device having a wound stator and a wound rotor, means for simultaneously connecting said motor to said rudder and to said wound rotor for actuating the latter relative to said stator, a source of alternating current, an induction device comprising a core of permeable magnetic material adapted to receive a magnetic flux from a uni-directional magnetic field, a secondary winding on said core, a primary winding on said core connected for energization by said source of alternating current, means for interconnecting the secondary winding of said core to the wound stator of said inductive device, and means comprising a vacuum tube amplifier for connecting the wound rotor of said inductive device to said motor for energizing the latter to operate said rudder.

9. An automatic steering system for a craft having a rudder, comprising an electromagnetic actuating device for operating said rudder, an inductive device having a wound stator and a wound rotor, means for simultaneously connecting said electromagnetic actuating device to said rudder and to said wound rotor for actuating the latter relative to said stator, a source of alternating current, an induction device comprising a core of permeable magnetic material adapted to receive a magnetic flux from a uni-directional magnetic field, a secondary winding on said core, a primary winding on said core connected for energization by said source of alternating current, means for interconnecting the secondary winding of said core to the wound stator of said inductive device, and means electrically connecting the wound rotor of said inductive device to said electromagnetic actuating device for energizing the latter to operate said rudder.

10. An automatic steering system for a craft having a rudder, comprising a servomotor for operating said rudder, an inductive device having a wound stator and a wound rotor, means connecting said motor to said wound rotor for actuating the latter relative to said stator, a source of alternating current, a magnetic pick-off device comprising a core of permeable magnetic material adapted to receive a magnetic flux from a uni-directional magnetic field, a secondary winding on said core, a primary winding on said core connected for energization by said source of alternating current, means for interconnecting the secondary winding of said core to the wound stator of said inductive device, means electrically connecting the wound rotor of said inductive device to said motor for energizing the latter to operate said rudder, means adapted for operation by said motor for modifying the energization of the latter, and means for connecting said last-named means for operation by said motor.

11. An automatic steering system for a craft having a rudder, comprising an inductive device including a pair of relatively movable members one of which is provided with a multi-polar winding and the other of which is provided with a single phase winding, an actuating device, means for connecting said actuating device to one of said members for moving the latter relative to its related member, a source of alternating current, an induction device comprising a core of permeable magnetic material adapted to receive a magnetic flux from a uni-directional magnetic field, a multi-polar stator winding on said core, a single phase winding on said core connected for energization by said source of alternating current, means for interconnecting the multi-polar winding of said core to the multi-polar winding of said inductive device, means electrically connecting the single phase winding of said inductive device to said actuating device for energizing the latter, and means operative when said actuating device has been connected to said one member for connecting said rudder to said actuating device for operation thereby upon the energization thereof.

12. An automatic steering system for a craft having a control surface, comprising a servomotor for operating said surface, an inductive device having a wound stator and a wound rotor, means connecting said motor to said wound rotor for actuating the latter relative to said stator, a source of alternating current, a magnetic pick-off device comprising a core of permeable magnetic material adopted to receive a magnetic flux from a uni-directional magnetic field, a secondary winding on said core, a primary winding on said core connected for energization by said source of alternating current, means for interconnecting the secondary winding of said core to the wound stator of said inductive device, means electrically connecting the wound rotor of said inductive device to said motor for energizing the latter to operate said surface, normally yieldably centered follow-up means adapted for operation by said motor for modifying the energization of the latter, and means for connecting said follow-up means for operation by said motor.

ALAN M. MacCALLUM.

REFERENCES CITED

The following references are of record in the file of this patent:

UNITED STATES PATENTS

| Number | Name | Date |
|---|---|---|
| 2,361,433 | Stuart | Oct. 31, 1944 |
| 2,416,097 | Hansen | Feb. 18, 1947 |